L. B. SPERRY.
AIR CURRENT INDICATOR FOR AEROPLANES.
APPLICATION FILED OCT. 9, 1916.

1,384,867.  Patented July 19, 1921.
2 SHEETS—SHEET 1.

INVENTOR
LAWRENCE B. SPERRY.
BY
Herbert H. Thompson
ATTORNEY.

L. B. SPERRY.
AIR CURRENT INDICATOR FOR AEROPLANES.
APPLICATION FILED OCT. 9, 1916.

1,384,867.

Patented July 19, 1921.
2 SHEETS—SHEET 2.

INVENTOR
LAWRENCE B. SPERRY.
BY
Herbert H Thompson
ATTORNEY.

UNITED STATES PATENT OFFICE.

LAWRENCE B. SPERRY, OF BROOKLYN, NEW YORK, ASSIGNOR TO THE SPERRY GYROSCOPE COMPANY, OF BROOKLYN, NEW YORK, A CORPORATION OF NEW YORK.

AIR-CURRENT INDICATOR FOR AEROPLANES.

1,384,867. Specification of Letters Patent. Patented July 19, 1921.

Application filed October 9, 1916. Serial No. 124,448.

*To all whom it may concern:*

Be it known that I, LAWRENCE B. SPERRY, a citizen of the United States, residing at 1505 Albemarle road, Brooklyn, in the county of Kings and State of New York, have invented certain new and useful Improvements in Air-Current Indicators for Aeroplanes, of which the following is a specification.

This invention relates to indicators for air craft, and more especially to the type of indicator which shows the direction of flight through the air, either in azimuth or in elevation, or both.

The object of my invention is to improve upon indicators of this character, which may be termed "air current indicators," so that the pilot will be kept informed at all times of the conditions of flight of the machine. For this purpose I prefer to provide both means for showing the direction of flight in elevation or an angle of incidence indicator, and means for showing the direction of flight in azimuth or a side slip indicator. Both of these indicators are based upon the relative directions of the air currents and the aeroplane. A further object of the invention is to so construct the indicator as to be visible from the pilot's seat irrespective of the position of the propeller. This has especial application in a tractor machine in which the propeller will obscure the view of the usual types of indicators.

Figure 1:
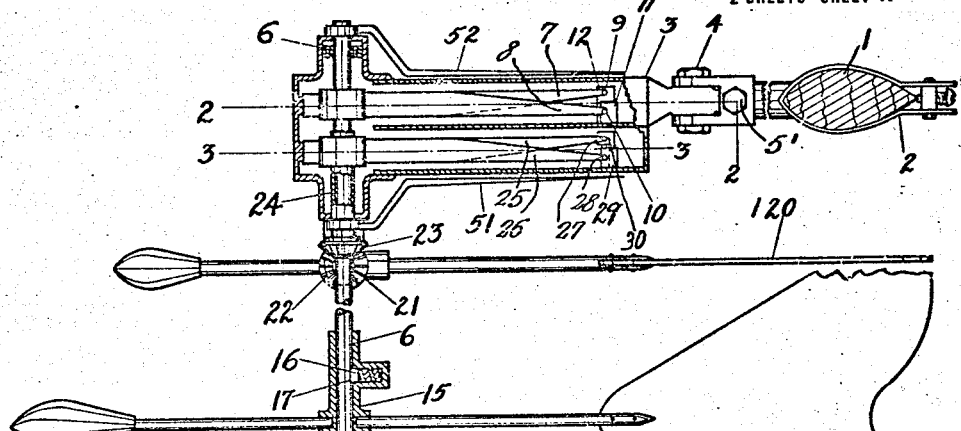
Figure 2:
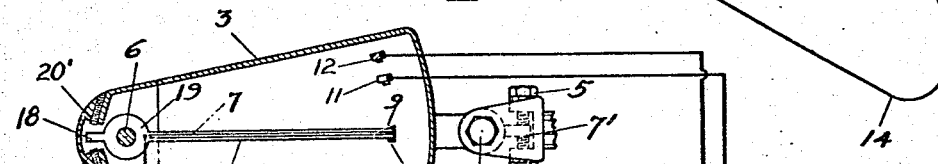
Figure 3:
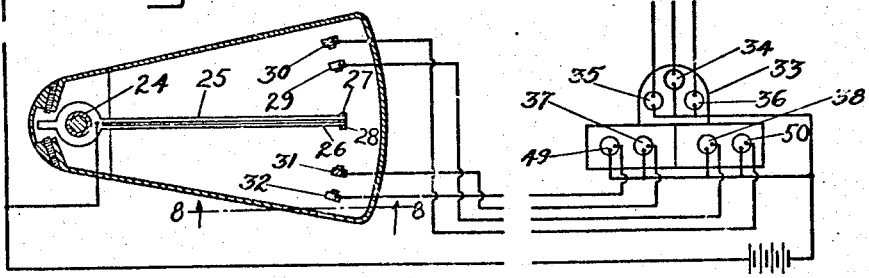
Figure 4:
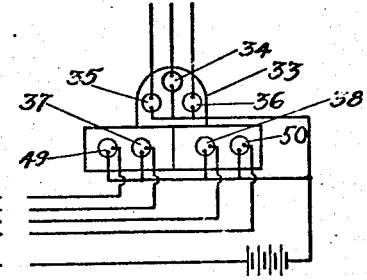
Figure 8:
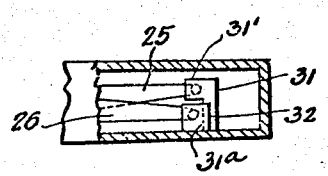
Figure 6:
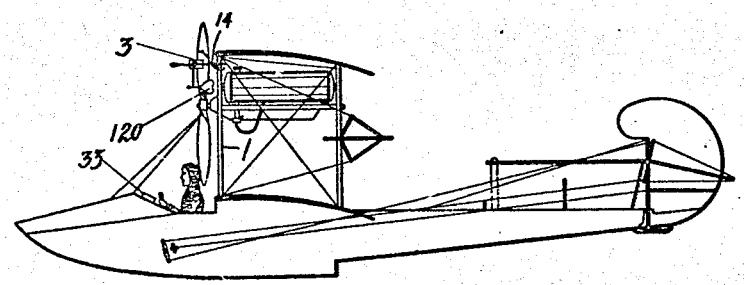
Figure 5:
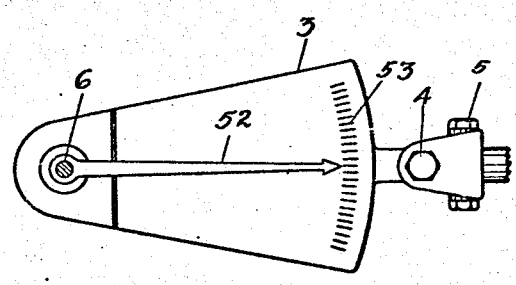
Figure 7:
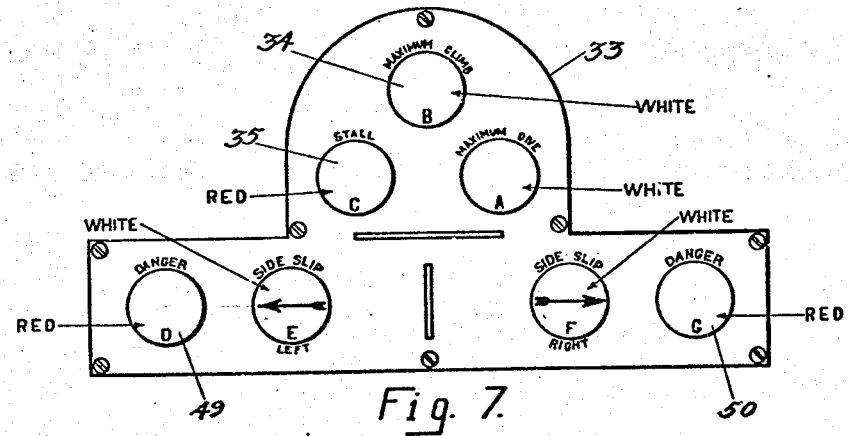

Referring to the drawings in which, what I now consider to be the preferred form of my invention is shown, Figure 1 is a longitudinal section partly in plan of the actuating portion of the indicator. Fig. 2 is a section of line 2—2 Fig. 1. Fig. 3 is a section of line 3—3 Fig. 1. Fig. 4, is a wiring diagram of the indicator or receiver which is to be read in connection with Figs. 2 and 3. Fig. 5 is a bottom view of the casing shown in Fig. 1. Fig. 6 is a diagrammatic view of a tractor aeroplane showing a typical method of applying my invention to an aeroplane. Fig. 7, is a view of the receiver. Fig. 8. is a detail on an enlarged scale taken on line 8—8 of Fig. 3.

The actuating or sending instrument may be secured in a convenient position on the aeroplane and is represented in Fig. 1 as clamped to a strut 1 by means of clamp 2. The casing 3 which supports the mechanism is pivoted on clamp 2 by means of a bolt 4. Adjustment of the casing on the clamp may be secured by means of a pair of set screws 5 and 5', which bear on opposite sides of a lug 7', extending rearwardly from casing 3. By loosening one of said screws and tightening the other the position of the casing with respect to the angle of incidence of the air craft may be readily adjusted so that the contacts hereinafter described may be positioned in their proper location.

Rotatably mounted within the casing is a shaft 6 to which is secured one or more contact arms 7 and 8. The ends 9 and 10 of the two arms are out of alinement as shown in Fig. 1. The end 10 of arm 8 is adapted to strike the contact 11, while the end 9 of arm 7 will pass over said contact and strike the taller contact 12 on further movement of the shaft 6. When shaft 6 rotates in the opposite direction, one or the other of said arms will strike contact 13. Secured adjacent the outer end of shaft 6 is a normally horizontal vane 14, which is adapted to set itself in the direction of the air  its in elevation, which vane constitu.  refore, an angle of incidence indicator.  he said vane is preferably secured to a sleeve 15 loosely mounted on shaft 6, but which is normally secured thereto by a spring pressed block 16 which engages a slightly flattened portion 17 of shaft 6. By this means I provide a safety catch which will avoid the breakage of the contacts 7 and 8 in case the vane is accidentally twisted through a large angle. Another means for protecting the contacts is to provide a lug 18 secured to shaft 6 and preferably forming a part of the block 19 to which the contacts are secured. Said lug is adapted to strike stops 20 and 20' adjustably positioned in the casing 3.

For indicating side slip I provide a normally vertical vane 120 which is pivoted on a shaft 21 extending preferably at right angles to shaft 6. Mounted on said shaft is a beveled gear 22 which meshes with bevel gear 23 on the sleeve 24 surrounding and journaled upon shaft 6. Said sleeve carries contact members 25 and 26 similar to contact arms 7 and 8, and having their ends 27 and 28 off-set in a similar manner. Arm 26 is adapted to strike contact 29, while upon further movement of sleeve 24, arm 25 will strike point 30. Rotation of sleeve 24 in the other direction will cause arm 25 to strike point 31 and arm 26 to strike point 32. In turning in the latter direction, the end of arm 26 with contact 28 passes under the projecting portion 31' of the contact member 31 (see Fig. 8), and within the upright portion or post thereof as indicated by dotted lines 31ª.

For indicating in connection with the climbing angle of the aeroplane, i. e. the angle of incidence, the vane 14 as we have seen is horizontal. When the craft is moving forward, the vane streams straight out. When the craft is pointed upwardly and moving in a line corresponding to its fore and aft axis, the vane will stream out along the said line since the movement of the air relative to the craft is along said line. When, however, the craft is pointing upwardly at too steep an angle, so that the engine is unable to lift it at such a rate as to cause it to move along the line of its fore and aft axis, it will slip forward as it climbs, and its actual course will be along a line at an angle to the said fore and aft axis. The vane 14 will then obviously lie along the line representing the actual upward course of the craft, and will thus be at an angle with the craft. When the fore and aft axis of the craft assumes a predetermined angle to its actual line of ascent, contact 10 is designed to engage point 11, and light 34 will indicate that the craft is climbing at its maximum angle; but when the angle becomes greater and the craft moves forward without rising at all or even moves forward and begins to fall, contact 9 will engage point 12 and light 35 will indicate that the craft is stalling. Similarly, when the craft dives, and more especially at the beginning of the dive, when the craft is suddenly pointed downwardly and its forward momentum carries it ahead of the line represented by its fore and aft axis, if this movement ahead relative to the axis approaches a rate beyond which there would be danger of the craft turning over, contact 10 is adapted to engage point 13 and light 36 will indicate the situation.

Exterior of casing 3 so as to be visible to the pilot, are located a pair of pointers 51 and 52 which are readable upon graduations 53 upon casing 3. Pointer 52 is secured to shaft 6 so as to indicate the angle of incidence, while pointer 51 is secured to sleeve 24 indicating, therefore, the side slip.

The contacts above described are placed in circuit with a receiver 33, suitably located on the aeroplane in a position near the pilot; for instance, as shown in Fig. 6. Said receiving instrument may comprise any suitable electrically operated optical device and is shown as comprising a plurality of electric lamps of suitable characteristics and markings, to indicate to the pilot the conditions of flight. A lamp 34 is in circuit with contact 11 and as shown in Fig. 7 preferably indicates when lighted that the machine is climbing at the maximum permissible angle. Any further increase in the angle would bring contact 9 in engagement with point 12 and light lamp 35 showing a danger signal such as red light, thus indicating to the pilot that the machine is about to stall. In circuit with contact 13 is a lamp 36 which indicates that the machine is diving at the maximum permissible angle. Similarly lamps 37 and 38 are connected to contacts 31 and 29 respectively, and indicate when lighted, that the machine is side slipping more than it should. This may indicate that the machine is not banked enough upon a turn, and is skidding, or it may indicate that the machine is banked too much, and is slipping toward the center of the turn, or it may indicate a number of other undesirable situations causing side slip. If further side slipping occurs in either direction, a red light 49 or 50 will be lighted indicating that the amount of side slip has become dangerous and must be immediately corrected.

From the above it will be apparent that I have provided a simple, reliable and useful indicator for aeroplanes, by which the pilot may be kept informed at all times of the exact condition of the machine with respect to the air currents, and whereby both preliminary warning and danger signals are shown.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. An air current indicator comprising, a wind operable vane adapted to place itself in the direction of the wind, a contact member connected to said vane and provided with a plurality of arms and a plurality of contacts, each of said contacts being engageable only by a corresponding one of said arms.

2. The combination with an aircraft, of a plurality of devices carried thereby and adapted to be positioned by the direction of the wind in a plurality of planes, a common mounting for said devices, electrical signaling means controlled by said devices for producing a warning when the position of the craft relative to the direction of the wind to one or both planes attains a predetermined value, and an additional means controlled by such devices for producing danger signals when said relative position becomes critical.

3. An air current indicator for airplanes comprising a plurality of wind operable vanes adapted to place themselves in the direction of the wind in a plurality of planes, a contact member connected to each of said vanes provided with a plurality of arms, a plurality of contacts, each of said contacts being engageable only by a corresponding one of said arms, and a distinctive signal operated by the contacts of each vane and arm.

In testimony whereof I affix my signature.

LAWRENCE B. SPERRY.